Patented Sept. 13, 1927.

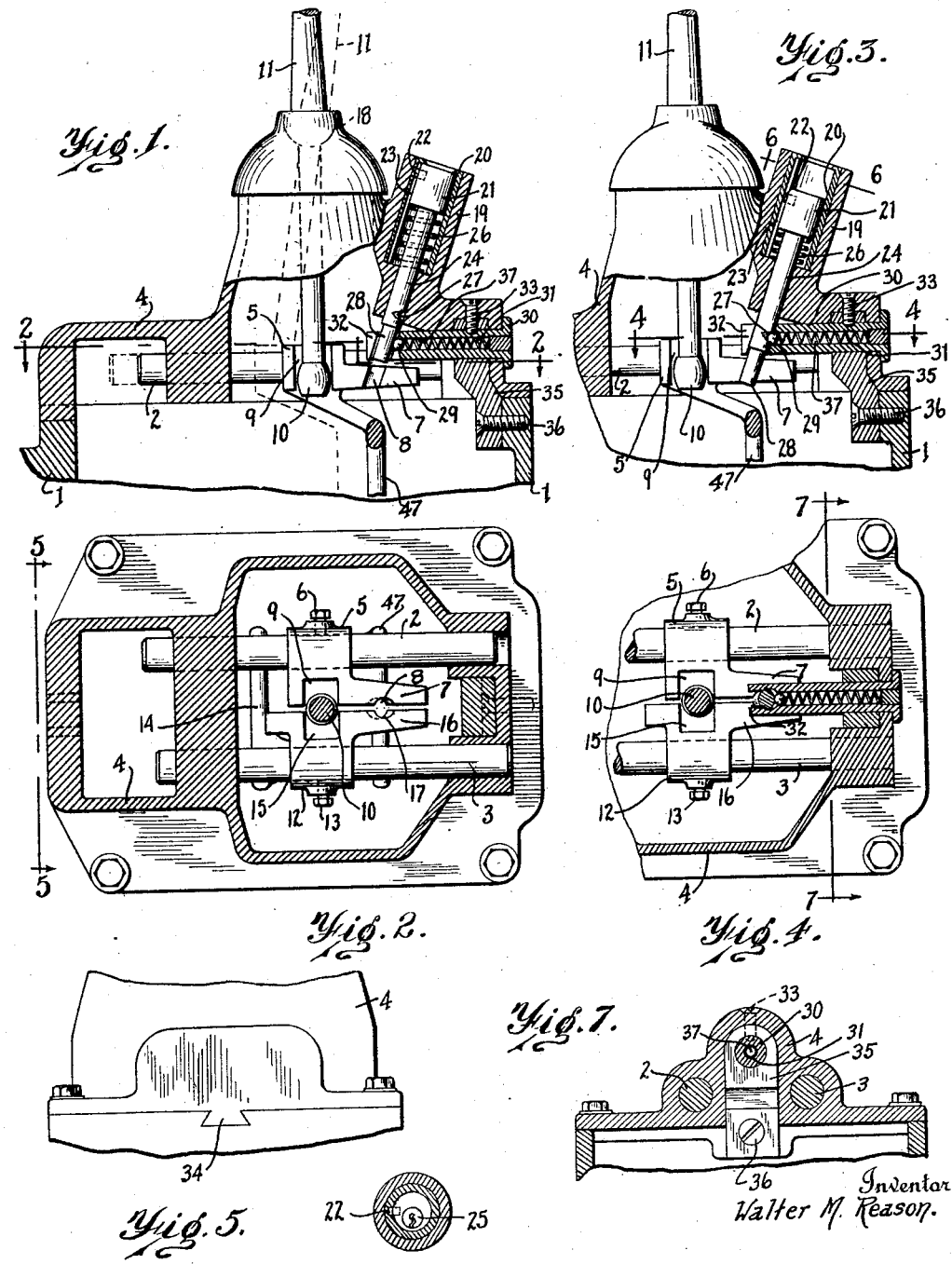

1,641,992

UNITED STATES PATENT OFFICE.

WALTER M. REASON, OF PONTIAC, MICHIGAN, ASSIGNOR TO ELIZABETH BALLAMOS, OF PONTIAC, MICHIGAN.

TRANSMISSION LOCK.

Application filed October 26, 1922. Serial No. 597,025.

This invention relates to transmission locks and the object of the invention is to provide a lock for locking the transmission gears on automobiles in the neutral position. Another object of the invention is to provide a lock which cannot be easily tampered with and which will not easily get out of order. A further object of the invention is to provide a lock for automobile transmissions which cannot be locked by accident. Another object of the invention is to provide a lock for the transmission gears of an automobile in which the device can only be locked when the gear shift is in the neutral position. The principal object of the invention is to provide a means for preventing theft of an automobile by locking the gear shifting mechanism so that none of the gears can be brought into driving arrangement and also to provide a means whereby the gear shift lever is locked and held from movement, the locking mechanism being closed in the transmission cover which is secured in position in a manner to prevent removal thereof. These objects and the several novel features of the invention are hereinafter more fully described and claimed and the preferred form of construction by which these objects are attained is shown in the accompanying drawings in which—

Fig. 1 is a section through the transmission cover and lock embodying my invention.

Fig. 2 is a section taken on line 2—2 of Fig. 1.

Fig. 3 is a view similar to Fig. 1 showing the device in the locked position.

Fig. 4 is a section taken on line 4—4 of Fig. 3.

Fig. 5 is a view taken from line 5—5 of Fig. 2.

Fig. 6 is a section taken on line 6—6 of Fig. 3.

Fig. 7 is a section taken on line 7—7 of Fig. 4.

As will be understood from Fig. 1 the transmission gears are mounted in the transmission casing 1 beneath the gear shifting mechanism shown in Fig. 1. A pair of shafts 2 and 3 are slidably mounted in the cover 4 for the casing. A member 5 is secured on the shaft 2 by the set screw 6. This member 5 carries a yoke 47 for operating the low speed and reverse gears. The member 5 is also provided with an extending end 7 having a semi-circular notch 8 therein and is also provided with a notch 9 to receive the lower end 10 of the gear shift lever 11 as will be readily understood from Figs. 1 and 2. A member 12 similar to the member 5 is secured to the shaft 3 by the set screw 13 and carries a yoke 14 for shifting the intermediate and high speed gears, the member 12 being also provided with a notch 15 for receiving the end 10 of the gear shift lever and when the gears are in neutral position the notches 9 and 15 are positioned opposite each other as shown in Fig. 2. The member 12 is also provided with an extending end 16 having a semi-circular notch 17 therein which is positioned opposite the semi-circular notch 8 of the member 5 when the device is in the neutral position. The gear shift lever 11 is provided with a ball shaped portion 18 which fits in a socket in the upwardly extending portion of the transmission cover and provides a pivot for the gear shift lever. The cover 4 for the transmission casing is provided with a boss 19 at one side of the gear shift lever having an aperture therein in which a sleeve 20 is made a press fit. Movable longitudinally of the sleeve 20 is a lock barrel 21 having a pin 22 protruding from the side thereof as shown in Figs. 1, 2 and 6. This pin 22 rides in a way 23 provided in the casing 20 and prevents rotation of the lock barrel in the sleeve. A shaft 24 is connected with the rotatable portion 25 of the lock as shown in Fig. 6 and a coiled spring 26 is positioned about the shaft 24 between the bottom of the recess and the lock barrel. This shaft 24 is provided with a notch 27 which tapers in depth from one side to the other of the shaft 24. The shaft 24 is provided with an end 28 of smaller diameter which is adapted in the locked position shown in Fig. 3 to extend through the semi-circular notches 8 and 17 provided in the member 5 and 12 and prevent movement of either gear shifting mechanism by the gear shift lever 11. The shoulder between the large portion of the shaft 24 and small portion 28 thereof is tapered on one side so as to allow the shaft to be moved from the position shown in Fig. 1 to that shown in Fig. 3 without catching on the ball 29. The ball 29 is carried in a member 30 providing a cover bolt and a spring 31 is provided forcing the ball into engagement in the notch 27. As shown in Fig. 4 the cover bolt 30 is provided with an aperture in the end thereof the same diameter as the shaft 24 and the end of the cover bolt 30 is slotted at 32 to a width equal to the diameter of the end 28 of the shaft 24. With this arrangement when the shaft 24 is in the position shown in Fig. 1 by removing the screw 33 the cover bolt 30 may be withdrawn from the transmission cover to allow removal of the cover and inspection of the interior of the transmission. When the device is locked as shown in Fig. 3 the large portion of the shaft 24 extends through the aperture in the cover bolt 30 and holds the cover bolt 30 in position, the shaft 24 being of greater diameter than the space 32 between the ends of the cover bolt 30. The cover as shown in Fig. 5 is provided with a tongue 34 engaging in a notch of like shape in the upper edge of the casing 1. With this arrangement when the device is locked the tongue 34 is held in its notch thus preventing upward movement of the edge of the cover in relation to the transmission casing.

In operation a member 35 is secured to the casing 1 by the screw 36 the member 35 being provided with an aperture therein for the cover bolt 30. The tongue 34 is then inserted in the notch therefor and the opposite edge of the cover is positioned over the member 35. At this time the bolt 24 is in its uppermost position and the cover bolt 30 is inserted through the aperture in the cover 4, thru the aperture in the member 35 so that the space 32 shown in Fig. 4 passes over the end 28 of the locking bolt and allows the end 28 to extend in the aperture in the end of the cover bolt 30. When this has been done the screw 33 is threaded through the casing and engages in a notch provided therefor in the cover bolt 30 thus holding the cover bolt 30 in position. By moving the gear shift lever 11 to the neutral position shown in Fig. 2, the device may be locked. This is accomplished by inserting the finger or other instrument through the open end of the sleeve 20 and forcing the lock and bolt to the position shown in Fig. 3 at which time the ball 29 engages in the notch 27 and prevents upward movement of the bolt by the spring 26. As the portion 24 of the bolt is of greater diameter than the space 32 between the ends of the cover bolt 30 the screw 33 can be removed but the cover bolt 30 cannot be withdrawn at this time and the screw 36 is in an inaccessible position and cannot be removed to allow removal of the cover. To unlock the device the key is inserted in the rotatable portion 25 of the lock to which the bolt 24 is secured and by turning the key the bolt is turned which by the peculiar shape of the arcuate notch 27 forces the ball 29 back into the aperture 37 at which time the spring 26 will force the lock and bolt up to the position shown in Fig. 1. The key is then turned back to the position shown in Fig. 6 before it can be withdrawn thus turning the notch 27 around to the position shown in full lines in Fig. 3 where, upon downward movement of the bolt, the ball will again engage in the notch 27.

A feature and object of vital importance in this device resides in the general structure employed to not only lock the gear operating mechanism in neutral position but further in thus locking the gear operating mechanism to lock the cover to the case. Many transmission locks heretofore in use are provided in the cover of the transmission case and lock the transmission operating mechanism but, by removal of the cover (which merely requires the taking out of a few screws), removes the operating lever and lock and enables a person, if bent on theft, to drive the car away as it only requires, after removal of the cover, to shift the gears by a small bar of any type as for instance a large screw driver. Thus such locks in reality do not prevent the theft of a car. By my arrangement in which the cover is locked to the case when the gear shifting mechanism is locked such theft and tampering with the mechanism is prevented.

From the foregoing description it becomes evident that the device is very simple and efficient in operation, will not easily get out of order, is composed of few parts and is of consequent low manufacturing cost, and provides a device which accomplishes the objects described.

Having thus fully described my invention, its utility and mode of operation, what I claim and desire to secure by Letters Patent of the United States is—

1. A transmission lock including a pair of operating members for the transmission, the said members being each provided with a notch adapted to be brought to opposed relation when the said members are in the neutral position, a lock comprising a longitudinally movable non-rotatable portion, a rotatable portion therein operable by a key, a locking bolt secured to the rotatable portion and having a notch in the side thereof, the bolt and lock being longitudinally movable, the end of the bolt engaging and fitting the aperture formed by the opposed notches of the operating members upon downward movement thereof, a spring pressed ball adapted to engage in the notch of the bolt and hold the same from longitudinal movement, the notch being so shaped that rotation of the lock by the key turns the bolt to move the notch out of engagement with the spring pressed ball and permit longitudinal movement, and yieldable means for moving the bolt to the unlocked position.

2. A transmission lock including a pair of operating members for the transmission, each of said members being provided with a notch adapted to be brought to opposed relation when the operating members are in the neutral position, a lock comprising a non-rotatable portion and a rotatable portion operable by a key, a locking bolt secured to the rotatable portion and having a notch in one side thereof, the bolt and lock being longitudinally movable to allow the bolt to engage in the aperture formed by the opposed notches of the operating members, a spring pressed ball adapted to engage in the notch of the bolt when in the locked position and hold the bolt from longitudinal movement, and means whereby operation of the lock by the key rotates the bolt to present a uniform surface to the spring pressed ball permitting longitudinal movement of the bolt, and yieldable means for retracting the bolt.

3. A lock for a transmission including a pair of members for operating the transmission, the said members being provided with semi-circular notches adapted to be brought to opposed relation when the gears are in neutral position, a lock comprising a non-rotatable portion and a rotatable portion operable by a key, a locking bolt secured to the rotatable portion, the lock and bolt being movable longitudinally to engage in the aperture formed by the opposed notches of the operating members, spring actuated means engaging the bolt and preventing longitudinal movement thereof when in locking position and rotation of the lock and bolt releasing the spring actuated means and permitting withdrawal of the bolt.

4. A transmission lock including a pair of members for operating the transmission, each of said members being provided with a notch adapted to be brought to opposed relation when the members are in neutral position, a lock comprising a longitudinally movable non-rotatable portion, and a rotatable portion operable by a key, a locking bolt secured to the rotatable portion, the bolt being movable longitudinally by longitudinal movement of the lock to engage in the aperture formed by the opposed notches of the operating members, means preventing withdrawal of the bolt when in the locked position, and means whereby rotation of the lock and bolt by the key allows withdrawal of the bolt.

5. A transmission lock comprising the combination with the transmission casing and cover therefor having a flange lying parallel with the wall of the casing, of a pair of rods mounted in the cover, a pair of gear operating members each having a part thereof provided with a notch and the said members being adapted to be brought to neutral position with the notches in opposed relation, a lock including a lock bolt rotatably mounted in the cover and adapted to be moved longitudinally with the bolt extending into the aperture formed by the said notches when the operating members are in neutral position, a cover bolt extending through the flange of the cover and the wall of the casing to the interior thereof and having an aperture at its inner end to receive the lock bolt when moved to locking position between the said notches, the lock bolt at the point passing through the cover bolt being of less width on one diametrical line and of greater width on a diametrical line at right angles thereto and also being provided with a notch in one of the side faces of the wide portion, a spring pressed ball in the cover bolt engaging the notch when the lock bolt is moved to locking position, the arrangement providing that rotation of the bolt through an arc of about ninety degrees retracts the ball thereby permitting longitudinal movement of the bolt, the said cover bolt having a slot in the end opening to the aperture therein for the lock bolt, the slot being of a width to permit the cover bolt to be withdrawn when the lock bolt has been turned to retract the spring pressed ball and to prevent withdrawal of the cover bolt when the lock bolt is turned to position with the ball in the notch.

6. A transmission lock comprising the combination with a transmission casing and cover therefor provided with a flange lying parallel with the wall of the casing, of a cover bolt extending through the flange and casing wall to the interior of the casing, rods mounted in the cover, gear operating members slidable on each rod each having a portion thereof provided with a notch in one face, the two members when moved into neutral position having their notches in opposed relation, a rotatable locking bolt adapted to be rotated and to be moved longitudinally with the end thereof engaging in the aperture formed by the opposed notches when the parts are in neutral position and preventing movement of the gear operating members, the said cover bolt having an aperture through which the locking bolt is moved to lock the gear operating member, means carried by the cover bolt for holding the lock bolt in locking position, and means whereby rotation of the bolt releases the said locking means permitting withdrawal of the lock bolt.

In testimony whereof, I sign this specification.

WALTER M. REASON.